United States Patent [19]

Hamilton

[11] Patent Number: 4,472,093
[45] Date of Patent: Sep. 18, 1984

[54] SCALLOPED HELICAL BLADE CUTTER

[76] Inventor: Martin N. Hamilton, R.D. #4, Middle Rd., Meadville, Pa. 16335

[21] Appl. No.: 360,582

[22] Filed: Mar. 22, 1982

[51] Int. Cl.³ .......................... B23C 5/00; B23C 5/20
[52] U.S. Cl. ...................................... 407/41; 407/42; 407/59; 407/116
[58] Field of Search .................... 467/59, 63, 41, 114, 467/115, 116, 42

[56] References Cited

U.S. PATENT DOCUMENTS

| | | | |
|---|---|---|---|
| 3,133,339 | 5/1964 | Ribich | 407/115 |
| 3,548,476 | 12/1970 | Cave et al. | 407/59 |
| 3,672,017 | 6/1972 | Nielsen et al. | 407/63 |
| 3,861,011 | 1/1975 | Nose et al. | 407/63 |
| 4,212,568 | 7/1980 | Minicozzi | 407/63 |
| 4,219,292 | 8/1980 | Hoffman et al. | 407/63 |
| 4,285,618 | 8/1981 | Shanley | 407/63 |

FOREIGN PATENT DOCUMENTS

| | | | |
|---|---|---|---|
| 1016093 | of 1957 | Fed. Rep. of Germany | 407/63 |
| 2715281 | of 1978 | Fed. Rep. of Germany | 407/63 |
| 7604450 | of 1976 | France | 407/63 |

Primary Examiner—Leonidas Vlachos
Assistant Examiner—Jerry Kearns
Attorney, Agent, or Firm—Charles L. Lovercheck; Wayne L. Lovercheck; Dale R. Lovercheck

[57] ABSTRACT

A helical cutter in the form of a frustum of a cone having a plurality of cutting inserts supported on its periphery and extending throughout its length. The cutting inserts are in the form of helices having scallops cut along their cutting edges.

9 Claims, 10 Drawing Figures

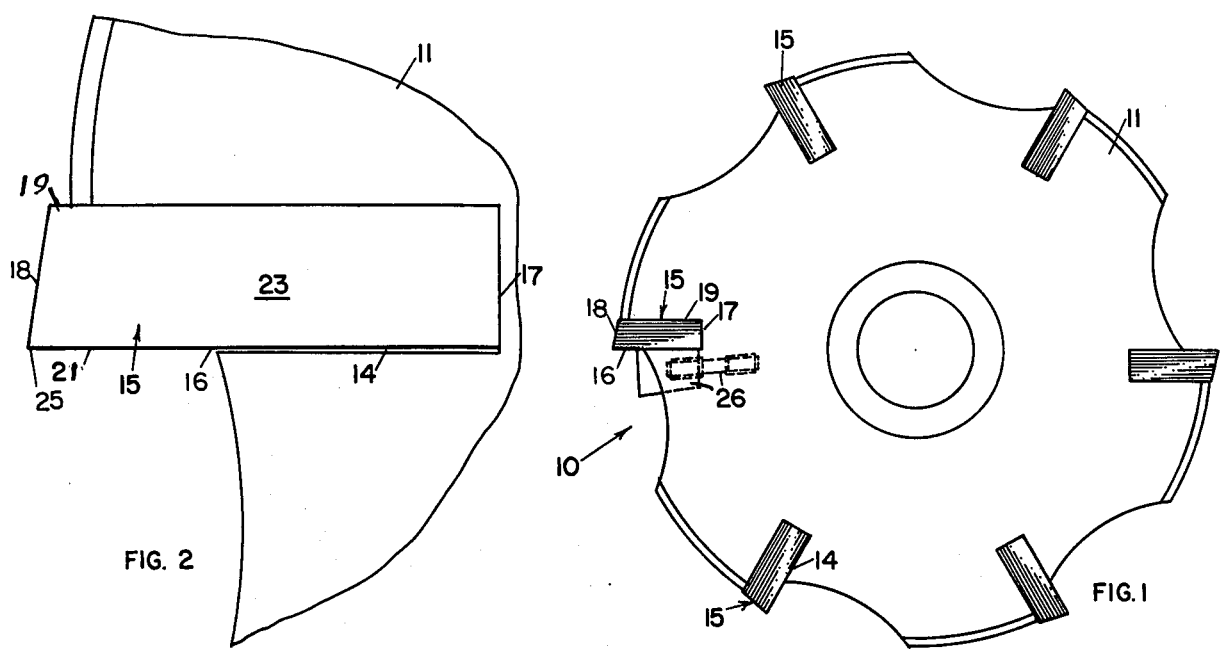
FIG. 2
FIG. 1
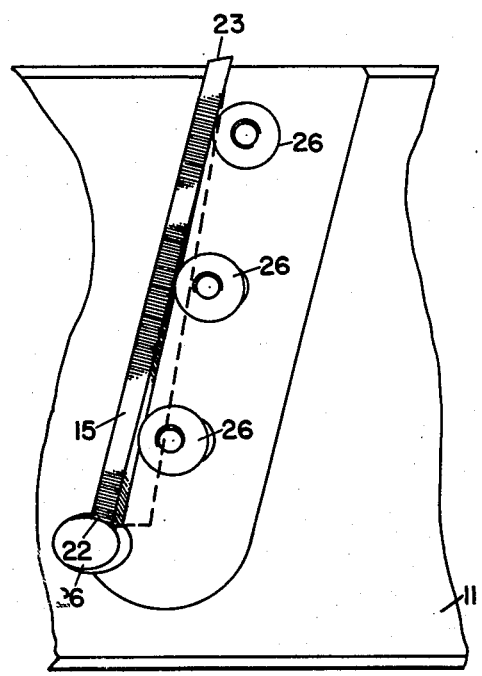
FIG. 3
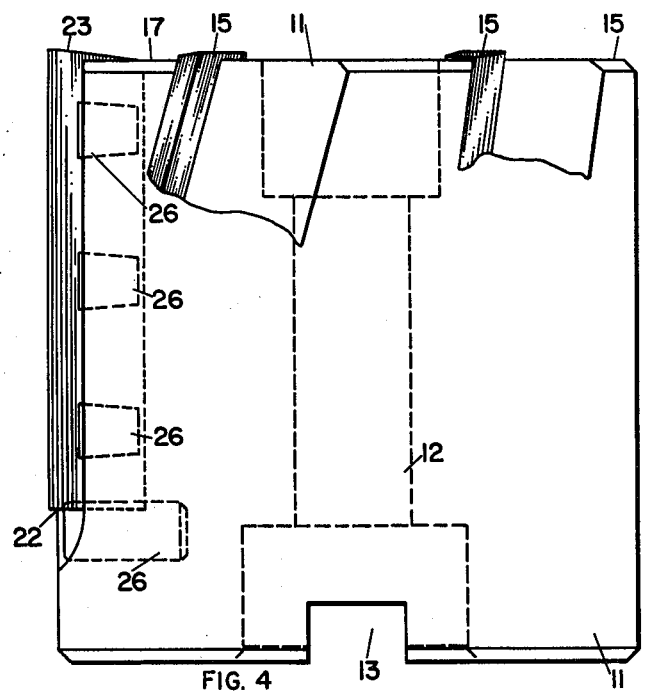
FIG. 4
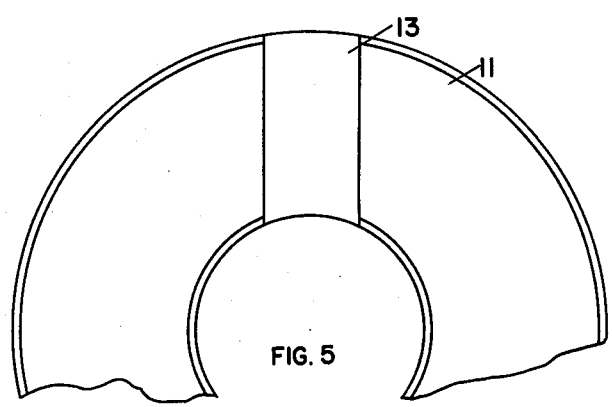
FIG. 5

SCALLOPED HELICAL BLADE CUTTER

REFERENCE TO PRIOR ART

Applicant is aware of U.S. Pat. No. 4,215,955 which shows a cutting tool with straight insert having a cutting edge formed in a sinusodial shape with front inclined at a substantial acute angle to the top surface of the cutting blade. This shape is far more difficult to machine than Applicant's scalloped blade and it would be extremely difficult to make this blade from carbide material which would require grinding. Applicant's cutting surface would also have a more efficient cutting action than that shown in the reference.

GENERAL DESCRIPTION OF THE INVENTION

Helical cutter inserts are generally known. For example, the insert shown in U.S. Pat. No. 3,133,339 shows an end mill with a helical cutting edge. The applicant knows of no helical cutting insert having scallops in the helix.

It is an object of the invention to provide an improved cutter having helical inserts in its outer periphery. Another object of the invention is to provide a frustoconical cutter with helical inserts with scallops therein.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is an end view of a cutter according to the invention.

FIG. 2 is a partial view of an end of the cutter shown in FIG. 1.

FIG. 3 is an enlarged partial top view of the cutter.

FIG. 4 is a top view of the cutter with certain parts broken away for better clarity.

FIG. 5 is an end view of the cutter shown in FIG. 4.

DETAILED DESCRIPTION OF THE DRAWINGS

Figure 6:
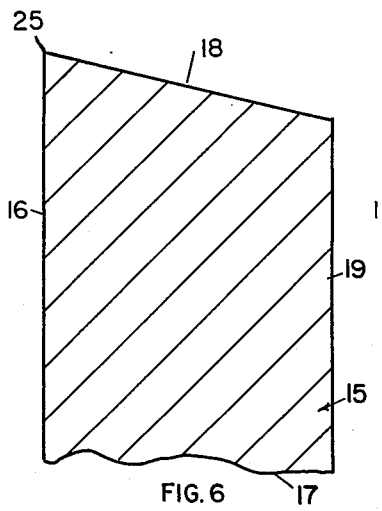
FIG. 6 is a cross sectional view taken on line 6—6 of FIG. 7.

Now with more particular reference to the drawings, a metal cutting tool is shown in the form of a cutter which is generally cylindrical in shape but slightly tapered toward its driven end to form a frustum of a cone. The cutter has a body 11, a central bore 12 and the radial slot 13 means on one end for driving the cutter. Generally axially extending helical slots 14 generally rectangular in cross section are formed in the outer periphery of the body 11, and these slots receive the helical cutting inserts 15.

The cutting inserts 15 are rectangular in cross section and have a front 16, back 17, top 18 and bottom 19. A cutting edge 25 is formed at the juncture of the top 18 and front by a plurality of longitudinally spaced notches formed in the cutting blade at the front and extending into the top and terminating in spaced relation to the bottom. Each of the notches comprises a part of a inside cylindrical wall 24 with the cylindrical wall having a central longitudinal axis spaced from the front of the insert and generally perpendicular to the top surface 18. The notched cutting edge provides a plurality of adjacent intersecting inside curved scallops forming a continuous cutting edge 25 at the top 18 to cut continuous elongated relatively narrow generally wavy chips having a length about equal to the length of the blade. The ends 22 of the inserts rest against locating pins 26'. Each of the inserts 15 are curved in the shape of a helix, with a helix angle of about 15° per inch of length. Scallops are cut in the leading cutting edge 25 of the insert. These scallops may be formed by a cylindrical tool having a radius R approximately equal to twice the pitch of the scallops that is twice the distance from the axis of curvature of one cylindrical scallop to the axis of curvature of the next adjacent scallop. The scallops have an arcuate curved bottom 24 and have a 5° cutting edge 25. The axis of the cutter is about 5° less than a right angle to the top surface 18 of the insert may be about 5° to the vertical or some other suitable acute angle. The insert is twisted approximately 10° to 15° per inch of length throughout its length.

Figure 10:
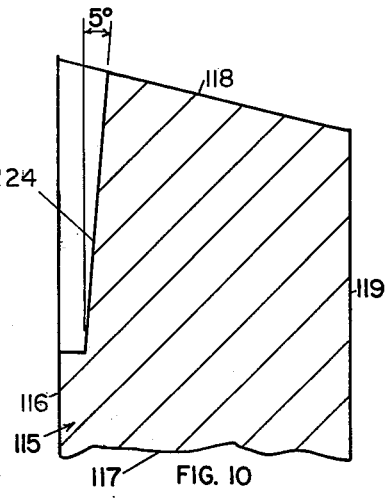
FIG. 10 is a view similar to FIG. 9 of another embodiment of the invention.
Figure 7:
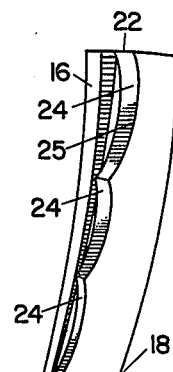
FIG. 7 is a side view of an insert.
Figure 9:
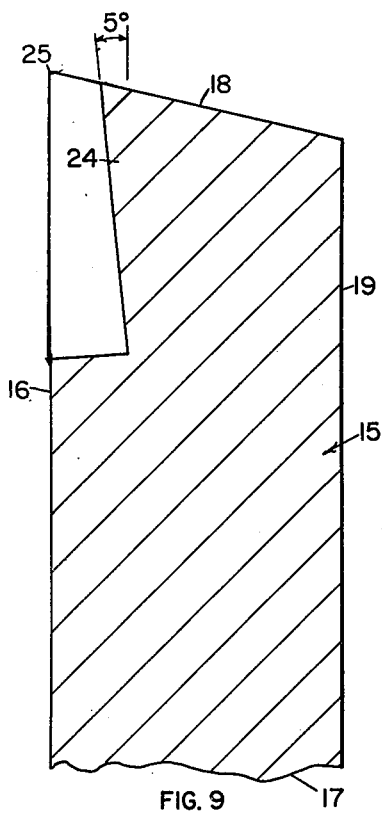
FIG. 9 is a cross sectional view taken on line 9—9 of FIG. 7.
Figure 8:
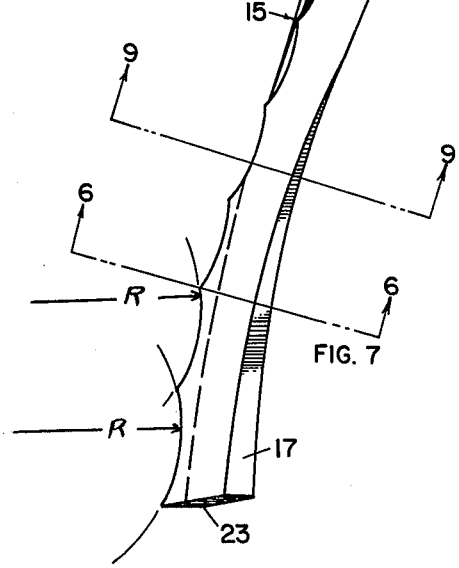
FIG. 8 is an end view of an insert.
Figure 8:
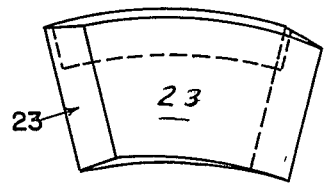

FIG. 10 shows an insert with a negative cutting angle. The embodiment of FIG. 10 shows an insert 115 having a front 116, back 117, top 118, bottom 119 and cylindrical surfaces 124 with cutting edges 125. The insert like the embodiment of FIGS. 1-9 will be received in slot 14. The insert will be twisted to form a helix and have scallops with base 124 as in FIG. 9, but the axis of the cutter will be inclined to give a negative cutting action relative to the base 124.

A plurality of frustoconical shaped dowels are inserted in bores in the body 11. Each dowel has a threaded screw member which is received in a radial hole in the cutter body for forcing the dowels into engagement with the leading side 21 of the insert 15 as shown in FIGS. 2, 3 and 4. At least three of the dowels engage each blade forcing the rear side of the inserts against the rear wall of the slot holding the insert in rigid clamped relation. The frustoconical dowels make line contact with the front edge of the inserts as shown in FIG. 1 thereby holding them in position. The slots are made about 0.020 inches oversize.

A plurality of second dowels 26' are provided. One said dowel is disposed in a hole at the inner end of each slot to positively locate the insert accurately. Pin 21 is disposed in a cylindrical bore in the body at an inner end of a particular slot so as to engage an end of the insert accurately. The insert is engaged by a said dowel, thereby holding the insert rigidly in position.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cutting tool comprising a generally cylindrical body, means on said body for connecting it to a rotatable member to rotate said body about its central axis, elongated helical cutting blades, means connecting said blades to said body to rotate with said body about said central axis, said blades each having a front, a top, a bottom and a back each joining the other, a cutting edge at the juncture of said top and front, comprising a plurality of longitudinally spaced notches formed in said cutting blade at said front and extending into said top and terminating in spaced relation to said back, each of said notches comprising a part of an inside cylindrical wall with the cylinder having its central longitudinal axis spaced from said front of said insert, generally perpendicular to said top surface, said notched cutting edge providing a plurality of adjacent intersecting inside curved scallops forming a continuous cutting edge, at said top adapted to cut continuous, elongated, relatively narrow, generally wavy chips having a length about equal to the length of said blade.

2. The tool recited in claim 1 wherein the depth of said notches is approximately 0.2 inches from said top to the bottom of said notch.

3. The cutting tool recited in claim 1 wherein the spacing of said notches is approximately half their radius of curvature.

4. The cutting tool recited in claim 1 wherein said helical cutting blades are twisted at about 15° per inch of length.

5. The cutting tool recited in claim 1 wherein said notches extend 0.031 inches deep from said front toward said back.

6. The blade recited in claim 1 wherein said blade is in the form of a removable insert and wedge means for attaching said blade to a cylindrical body.

7. The blade recited in claim 1 wherein said cylindrical inside wall inclines toward said back at the top at a small acute angle whereby a negative cutting edge is provided.

8. The blade recited in claim 7 wherein said angle of incline is approximately five degrees.

9. The blade recited in claim 1 wherein said cylindrical inside wall inclines toward said front at the top at an angle of approximately five degrees whereby a positive cutting edge is provided.

* * * * *